(12) United States Patent
Ichikawa et al.

(10) Patent No.: US 8,156,850 B2
(45) Date of Patent: Apr. 17, 2012

(54) TAILSTOCK CONTROL DEVICE

(75) Inventors: Yoshiichi Ichikawa, Aichi (JP); Takashi Nishimoto, Aichi (JP); Kazuhisa Niwa, Aichi (JP)

(73) Assignee: OKUMA Corporation, Aichi (JP)

( * ) Notice: Subject to any disclaimer, the term of this patent is extended or adjusted under 35 U.S.C. 154(b) by 556 days.

(21) Appl. No.: 12/363,274

(22) Filed: Jan. 30, 2009

(65) Prior Publication Data

US 2009/0199685 A1    Aug. 13, 2009

(30) Foreign Application Priority Data

Feb. 8, 2008   (JP) ................. 2008-028610

(51) Int. Cl.
*B23B 23/00*   (2006.01)
*B23B 3/00*    (2006.01)
(52) U.S. Cl. .......................... 82/148; 82/118
(58) Field of Classification Search .............. 82/148, 82/1.11, 117, 118
See application file for complete search history.

(56) References Cited

U.S. PATENT DOCUMENTS

| | | | | | |
|---|---|---|---|---|---|
| 2,247,562 | A | * | 7/1941 | Santen | 74/59 |
| 3,470,721 | A | * | 10/1969 | Scheublein, Jr. et al. | 72/144 |
| 3,613,424 | A | * | 10/1971 | Normos | 72/103 |
| 3,731,564 | A | * | 5/1973 | Diener et al. | 82/148 |
| 3,796,116 | A | * | 3/1974 | Spreitzer | 82/120 |
| 4,335,633 | A | * | 6/1982 | Boffelli | 82/148 |
| 5,525,092 | A | * | 6/1996 | Hirano et al. | 451/5 |
| 5,575,041 | A | * | 11/1996 | Lee | 82/148 |
| 6,122,998 | A | * | 9/2000 | Iwashita | 82/1.11 |

FOREIGN PATENT DOCUMENTS

| | | |
|---|---|---|
| JP | 4-63603 | 2/1992 |
| JP | 2000-153431 | 6/2000 |

OTHER PUBLICATIONS

Esp@cenet patent abstract for Japanese Publication No. 4063603, Publication date Feb. 28, 1992 (1 page).
Esp@cenet patent abstract for Japanese Publication No. 2000153431, Publication date Jun. 6, 2000 (1 page).

* cited by examiner

*Primary Examiner* — Will Fridie, Jr.
(74) *Attorney, Agent, or Firm* — Osha • Liang LLP

(57) ABSTRACT

A tailstock control device supports an object to be machined by driving and controlling a servo motor which drives a driving system of a tailstock having a spring member in forward and backward directions, to cause a tailstock center connected to the tailstock to contact a center hole of the object to be machined. The tailstock control device comprises a limit torque value calculating unit which calculates, as a limit torque value (Tm), a drive torque value of the servo motor necessary for supporting the object to be machined, and a servo control unit which drives and controls the servo motor to attempt to move the tailstock at a tailstock movement velocity (Vs) which is set in advance, until an output torque value (Tr) of the servo motor reaches the limit torque value (Tm). The limit torque value (Tm) is calculated by subtracting, from the support thrust (Fa) necessary for supporting the object to be machined, an excessive thrust Fs which is calculated based on the tailstock movement velocity (Vs).

2 Claims, 7 Drawing Sheets

TAILSTOCK CONTROL DEVICE

PRIORITY INFORMATION

This application claims priority to Japanese Patent Application No. 2008-028610 filed on Feb. 8, 2008, which is incorporated herein by reference in its entirety.

BACKGROUND

1. Technical Field

The present invention relates to a tailstock control device which supports an object to be machined by controlling a servo motor which drives a driving system of a tailstock having a spring member in forward and backward directions, to cause a tailstock center connected to the tailstock to contact a center hole of the object to be machined.

2. Related Art

Conventionally, driving of a tailstock which supports an object to be machined on a numerical control lathe has been largely by hydraulic driving. In recent years, however, electric tailstocks which are driven and controlled by a servo motor are employed.

One reason why an electric tailstock has been employed is that with the servo motor, the supporting thrust of the object to be machined can be freely controlled by controlling the drive torque. There are also other reasons such as that the non-operational time, such as the thrust change during setup of high-mix low-volume workpiece, can be reduced by controlling the support thrust, and that the energy consumption of the tool can be reduced by removing the hydraulic unit.

FIG. 2 shows an example of a mechanism of an electric tailstock which is driven and controlled by a servo motor. In this mechanism, a feed screw 106 connected to a servo motor 9 rotates with the driving of the servo motor 9. With this rotation, a tailstock 102 which is threaded and connected to the feed screw 106 is driven and controlled. As a result, a tailstock center 101 attached to the tailstock 102 is mated with the center hole of an object 100 to be machined, and the object 100 to be machined is supported. In order to maintain the support thrust for supporting the object to be machined even after the power of the motor is switched off, a spring 104 is typically provided at the rear side of the tailstock center 101.

In this mechanism, the drive torque (torque limit value Tm) of the servo motor required for generating a thrust (support thrust) necessary for reliably supporting the object to be machined is calculated based on the support thrust. A transmission mechanism exists in the driving system. Because of this, in general, the limit torque value Tm is calculated in consideration of the transmission efficiency of the transmission mechanism and subtracting a torque loss due to the driving system from the support thrust. In other words, in the related art, the torque limit value Tm of the servo motor necessary for generating the support thrust is calculated based on the support thrust and the transmission efficiency of the driving system. Next, the related art will be described with reference to a block diagram of FIG. 7.

A tailstock support thrust Fa which is set in advance in a tailstock thrust setting unit 1 is input to a torque instruction converter unit 3. Tailstock parameters N which indicate the torque loss of the driving system such as a gear ratio of the driving system which is set in a tailstock parameter setting unit 2, a tailstock sliding surface resistance, frictional torque of the feed screw shaft receiving unit, and efficiency of a ball screw are also input to the torque instruction converter unit 3. The torque instruction converter unit 3 calculates, as the torque limit value Tm, a torque value of the servo motor necessary for generating the support thrust Fa, based on the support thrust Fa and the transmission parameters N.

A tailstock instruction unit 5 generates a tailstock instruction by a manual operation or by a machining program (neither of which is shown), and activates a tailstock control unit 6. The activated tailstock control unit 6 controls the torque of the servo motor 11 through a servo control unit 7 and a power amplifier unit 10, based on parameters such as a tailstock movement velocity Vs which are output from a tailstock velocity setting unit 4. The servo control unit 7 calculates an instruction torque value Tr in response to the instruction from the tailstock control unit 6 and outputs the instruction torque value to the power amplifier unit 10. The power amplifier unit 10 supplies power corresponding to the instruction torque value Tr to the servo motor 11. At this point, the tailstock control unit 6 stores the torque limit value Tm converted by the torque instruction converter unit 3 in a torque instruction value storage unit 8, and transmits the torque limit value Tm to the servo control unit 7. The servo control unit 7 executes the torque limit control of the servo motor 11 with the upper limit at the torque limit value Tm.

With the above-described structure, the servo motor 11 which drives the tailstock is driven and controlled, and the object to be machined is supported by the tailstock center provided on the tailstock mating with the center hole of the object to the machined. The servo control unit 7 stops the feeding of the tailstock when the instruction torque value Tr (output torque value of the servo motor) reaches the limit torque value Tm. With this process, the object to be machined is supported with a predetermined support thrust.

According to the related art described above, the limit torque value Tm of the servo motor 11 is calculated in consideration of parameters such as the tailstock sliding surface, frictional torque at the feed screw shaft receiving unit, and efficiency of the ball screw, in addition to the tailstock support thrust Fa which is set in advance. Because of this structure, the object to be machined can be supported with the predetermined support thrust Fa. However, in the supporting of the object to be machined, during a period from the time when the feeding operation of the tailstock is stopped when the drive torque Tr reaches the torque limit value Tm to the time when the tailstock actually stops, a slight movement distance is created due to the inertial force, and an excessive thrust is caused. In addition, in a tailstock in which a spring mechanism is built-in to the driving system, the spring is compressed by the movement distance until the tailstock is stopped, and an excessive thrust would be applied to the object to be machined. In addition, there has been a problem in that when the tailstock movement velocity is changed, the movement distance until the tailstock stops is also changed, and variation occurs in the support thrust.

SUMMARY

According to one aspect of the present invention, there is provided a tailstock control device which supports an object to be machined by driving and controlling a servo motor which drives a driving system of a tailstock having a spring member in forward and backward directions, to cause a tailstock center connected to the tailstock to contact a center hole of the object to be machined, the tailstock control device comprising a limit torque value calculating unit which calculates, as a limit torque value, a drive torque value of the servo motor necessary for supporting the object to be machined, and a servo control unit which drives and controls the servo motor to attempt to move the tailstock at a tailstock movement velocity which is set in advance, until an output torque value of the servo motor reaches the limit torque value, wherein the limit torque value calculating unit comprises a unit which calculates, as a support thrust, a thrust of the tailstock necessary for supporting the object to be machined, an excessive thrust calculating unit which calculates, as an excessive thrust, an excessive thrust due to an elastic restoring force caused by compression of the spring member during a period between the contact of the tailstock center moving in the tailstock movement velocity to the object to be machined and stopping of the tailstock center, and a unit which calculates the limit torque value by subtracting the excessive thrust from the support thrust.

According to another aspect of the present invention, it is preferable that the tailstock control device further comprises an actual velocity detecting unit which detects, as an actual velocity, a velocity of the tailstock at the time when the output torque value of the servo motor reaches the limit torque value, wherein the limit torque value calculating unit re-calculates the limit torque value while replacing the set movement velocity with the actual velocity when the actual velocity is detected, and the servo control unit drives and controls the servo motor based on the re-calculated limit torque value when the limit torque value is re-calculated.

According to various aspects of the present invention, the excessive thrust caused by the object to be machined caused by the compression of the spring due to movement until the tailstock stops is calculated in advance and is subtracted from the instruction thrust, to correct the instruction thrust. Because of this structure, no variation occurs in the support thrust even when the tailstock movement velocity is changed, protrusion of the work during machining due to insufficient thrust and deformation of the work due to excessive pushing can be removed, and a tailstock control device which is extremely safe can be provided.

BRIEF DESCRIPTION OF THE DRAWINGS

Preferred embodiments of the present invention will be described in detail by reference to the drawings, wherein.

DETAILED DESCRIPTION

Figure 1:
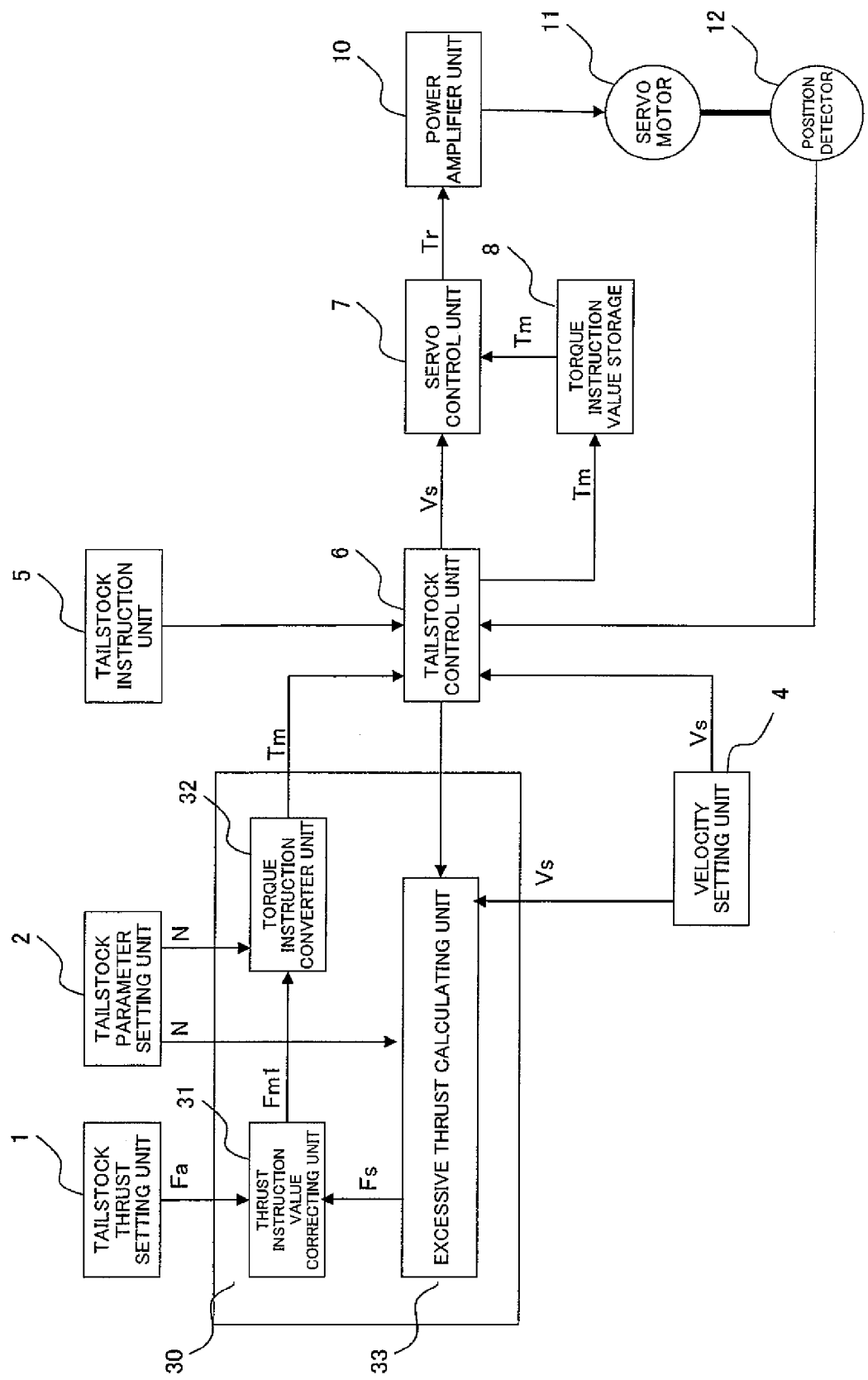
FIG. 1 is a block diagram of a tailstock control device of a first preferred embodiment of the present invention.
Figure 3:
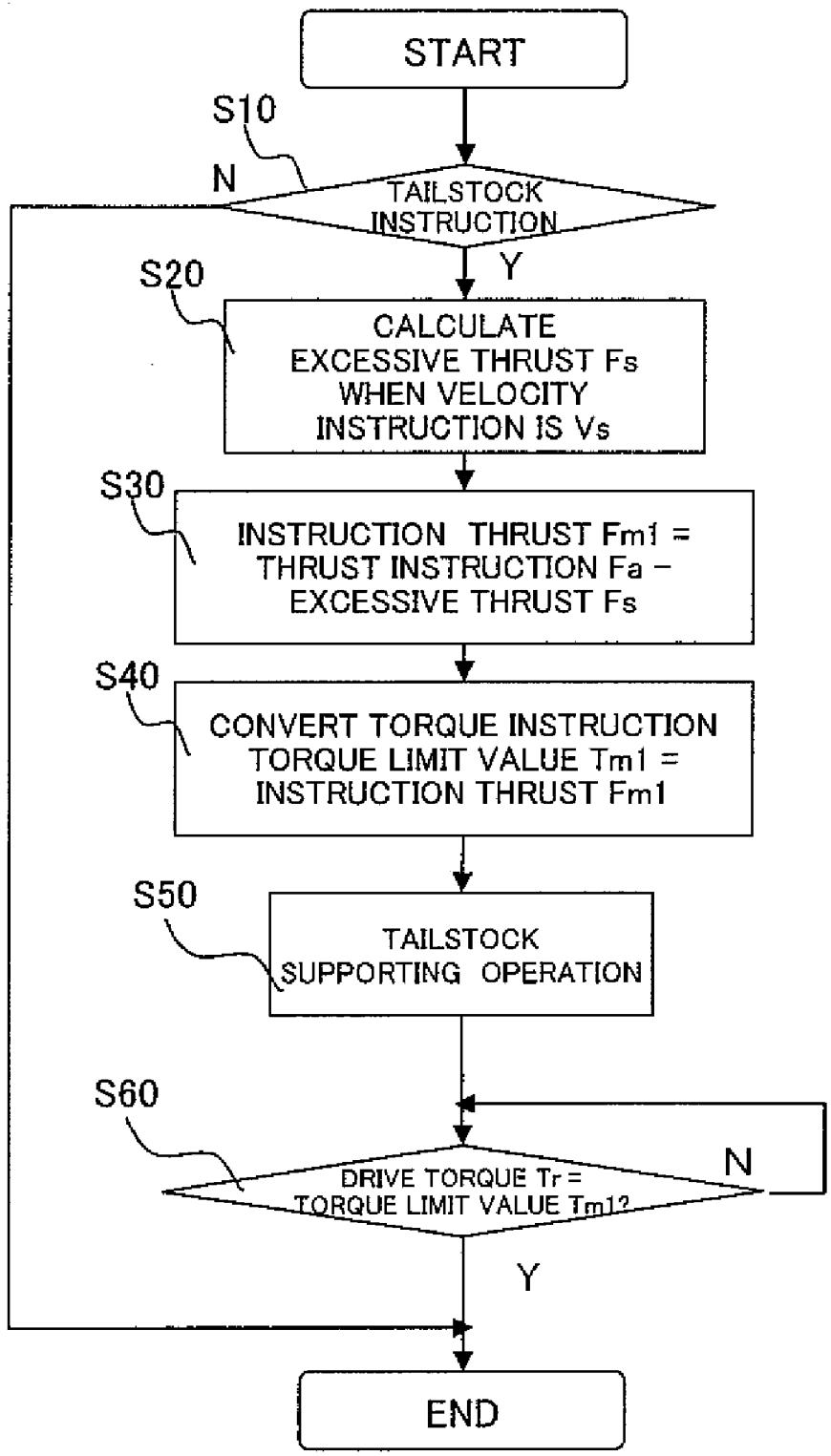
FIG. 3 is a flowchart showing a flow of control by a tailstock control device in a first preferred embodiment of the present invention.

A first preferred embodiment of the present invention will now be described with reference to FIGS. 1 and 3. FIG. 1 is a block diagram of a tailstock control device according to a first preferred embodiment of the present invention. FIG. 3 is a flowchart showing a flow of control by the tailstock control device. Elements of the tailstock control device that are identical to those in the related art will not be described in detail.

Figure 2:
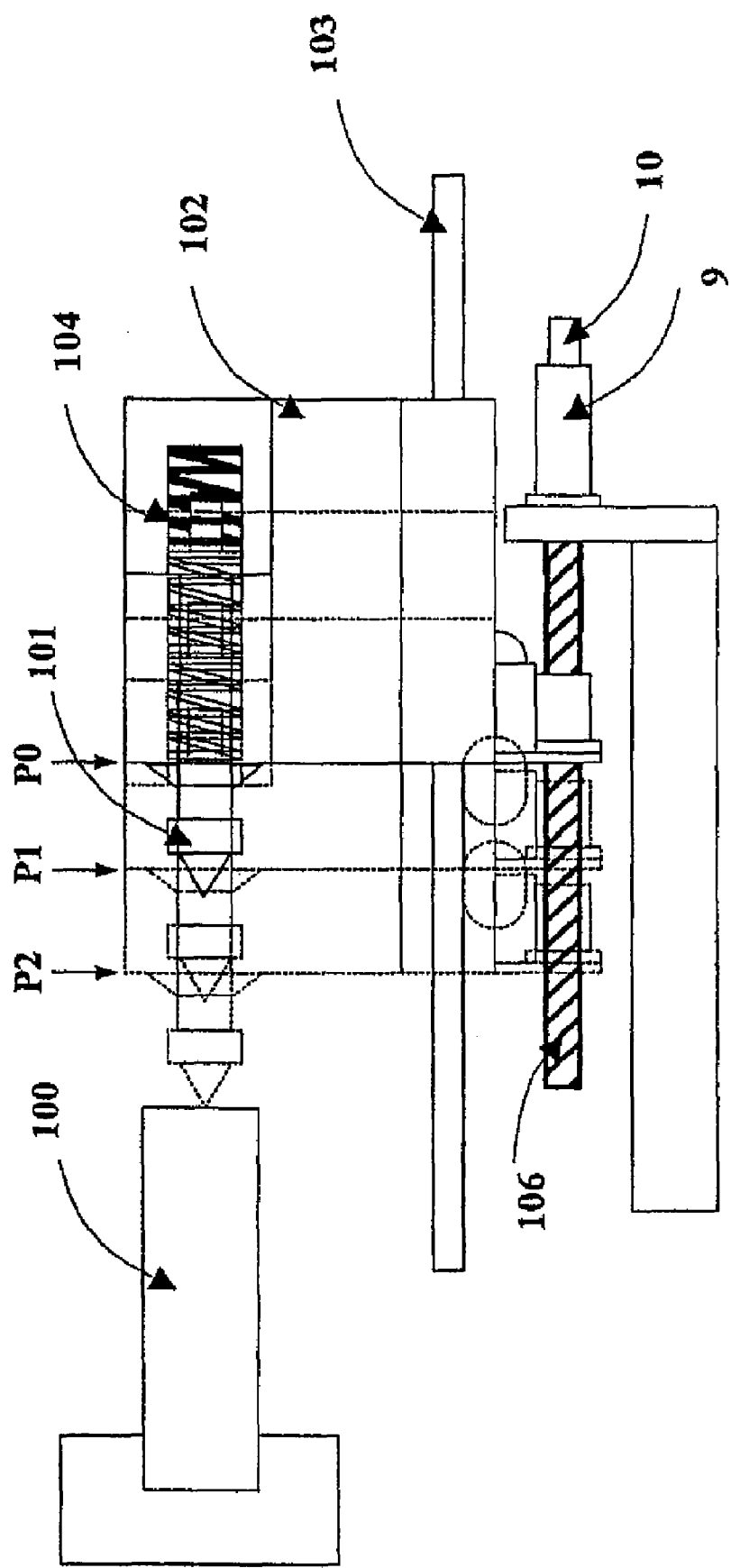
FIG. 2 is a schematic structural view of a tailstock to be controlled.

Similar to the related art, the tailstock control device of the present embodiment controls a tailstock having a driving system with a built-in spring 104 as shown in FIG. 2. The tailstock control unit 6 is activated via the tailstock instruction unit 5 when a tailstock instruction is executed by a manual operation or by a machining program (neither of which is shown) (S10). The activated tailstock control unit 6 drives and controls an excessive thrust calculating unit 33 and a limit torque value calculating unit 30 (which comprises a thrust instruction value correcting unit 31, a torque instruction converter unit 32, and an excessive thrust calculating unit 33), to instruct calculation of a limit torque value Tm.

A flow of the calculation of the limit torque value Tm will now be described in detail. In this case, first, the excessive thrust calculating unit 33 calculates an excessive thrust Fs (S20). The excessive thrust Fs is a thrust which is caused by an elastic force of the spring or the inertial force when the movement velocity of the tailstock is Vs. The excessive thrust Fs is calculated based on tailstock parameters N which are set in the tailstock parameter setting unit 2 (including a feed screw efficiency η, rotational inertia I, spring constant k, feed screw lead l, tailstock weight w, and acceleration g), and the tailstock movement velocity Vs which is set in the tailstock velocity setting unit 4. More specifically, when a spring 104 is built-in at the rear of the tailstock center 101, the excessive thrust Fs is calculated through the following Equation 1.

$$Fs = kx \qquad (1)$$
$$= \omega \sqrt{(k(I + wl^2/4\Pi^2 g))}$$

In Equation 1, k represents the spring constant, x represents the amount of compression of the spring, I represents the rotational inertia, w represents the tailstock weight, l represents the lead of the feed screw, g represents the acceleration, and ω represents an angular velocity of the motor. Of these, the angular velocity ω is calculated as $\omega = 2\pi N/60$ when the number of rotations of the motor is N (N=Vs/l). As described above, Equation 1 is an equation for the case where the spring 104 is built-in at the rear of the tailstock center 101, and the excessive force Fs may be calculated using suitable equations different from Equation 1, according to the placement location of the spring 104. For the calculation of the excessive force Fs, a relationship equation of the rotational energy Er, the kinetic energy Em, and the elastic energy Es as shown in the following Equation 2 is used. In Equation 2, v represents the rotational velocity of the motor (v=Vs).

$$Er = I\omega^2/2 \qquad (2)$$
$$Em = wv^2/2g$$
$$Es = kx^2/2$$
$$Er + Em = Es$$

The excessive thrust Fs calculated in the excessive thrust calculating unit 33 is input to the thrust instruction value correcting unit 31. In addition, the tailstock support thrust Fa which is set in the tailstock thrust setting unit 1 is also input to the thrust instruction value correcting unit 31. Here, the tailstock support thrust Fa is calculated and set by the following Equation 3. In Equation 3, η represents the feed screw efficiency, T represents a motor torque, and l represents the screw lead.

$$Fa = 2\pi\eta T/l \qquad (3)$$

The thrust instruction value correcting unit 31 subtracts the excessive thrust Fs from the input tailstock support thrust Fa and calculates a corrected thrust Fm1 (S30). The calculated corrected thrust Fm1 is input to the torque instruction converter unit 32. In addition to the corrected thrust Fm1, the tailstock parameters N which are set in the tailstock parameter setting unit 2 are also input to the torque instruction converter unit 32. The torque instruction converter unit 32 calculates the torque of the servo motor necessary for obtaining the tailstock support thrust Fat that is, the limit torque value Tm, based on the input corrected thrust Fm1 and the input tailstock parameters N (S40). More specifically, the torque instruction converter unit calculates, as the limit torque value Tm, a value that is the torque loss of the driving system, which is calculated based on the tailstock parameters N, subtracted from the corrected thrust Fm1. The calculated limit torque value Tm is stored in the torque instruction value storage 8 through the tailstock control unit 6. When the limit torque value Tm is stored in the torque instruction value storage 8, the servo control unit 7 starts transmission of the drive torque Tr to the power amplifier unit 10, and starts the tailstock supporting operation, that is, the movement operation of the tailstock (S50). Then, it is monitored whether or not the drive torque Tr has reached the limit torque value Tm (S60). When the drive torque Tr reaches the torque limit value Tm, it is determined that the state where the object to be machined can be supported (that is, a support thrust is being generated) has been reached, and the driving of the tailstock is stopped.

As is clear from the above description, the limit torque value Tm in the present embodiment has a value which takes into consideration the excessive thrust Fs (refer to Equation 1) which is calculated based on parameters such as the spring constant k and the movement velocity Vs of the tailstock. Because of this, even when the tailstock movement velocity changes or the spring is compressed, the variation in the support thrust can be reduced. As a result, it is possible to prevent protrusion of the workpiece during the machining due to insufficient thrust and deformation of the workpiece due to excessive pushing, and to provide a tailstock control device which is extremely safe.

Figure 4:
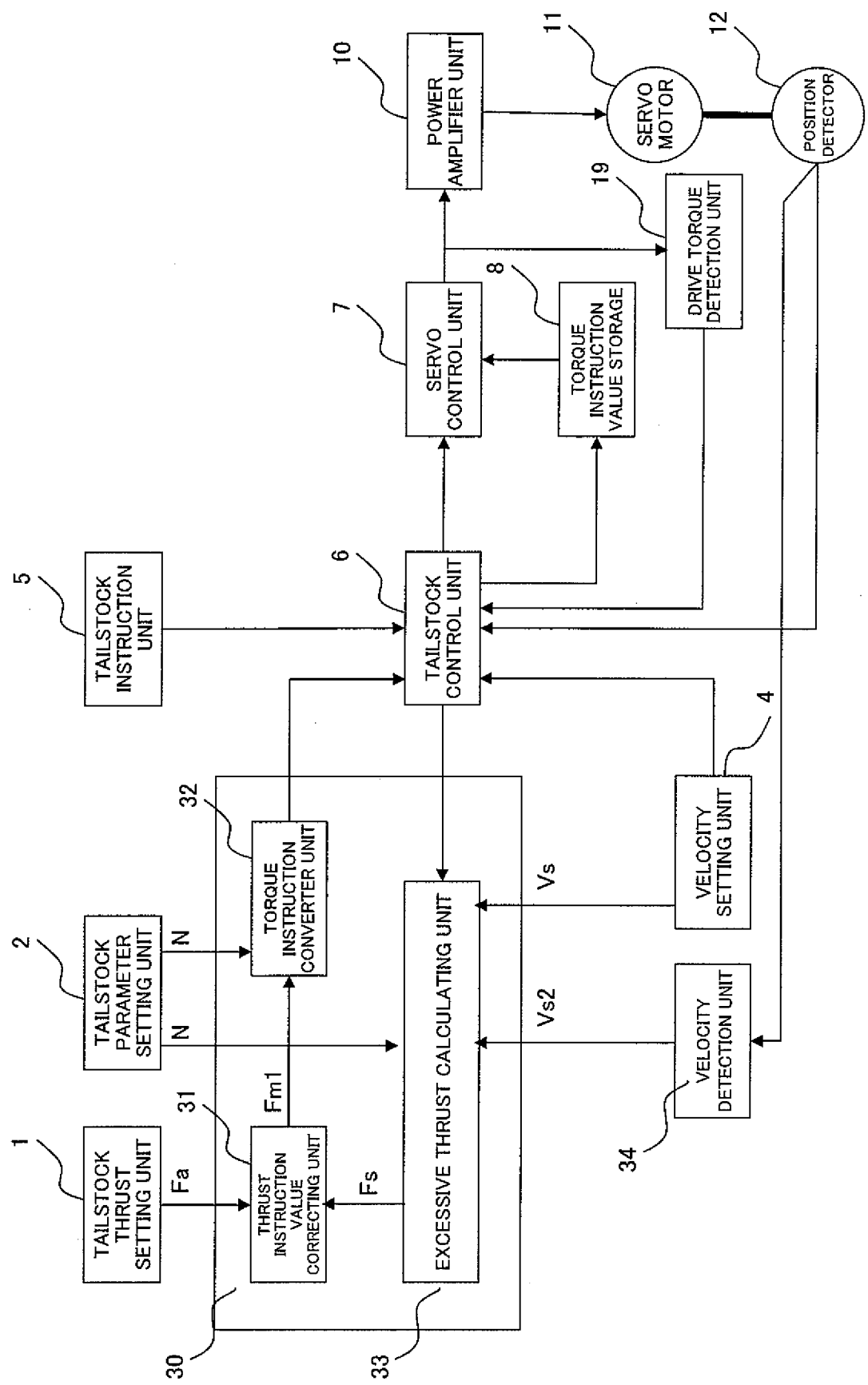
FIG. 4 is a block diagram of a tailstock control device according to a second preferred embodiment of the present invention.
Figure 5:
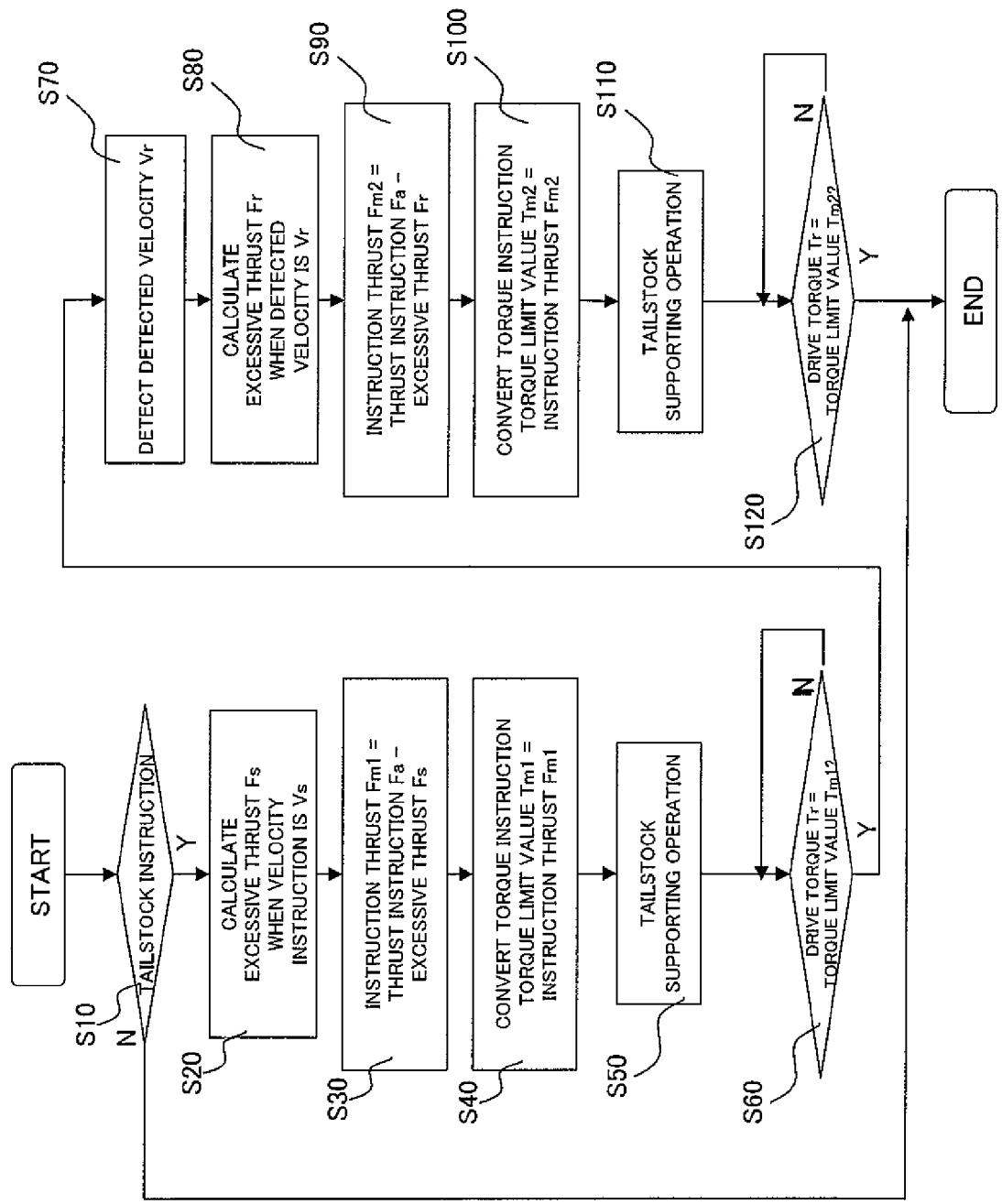
FIG. 5 is a flowchart showing a flow of control by a tailstock control device of a second preferred embodiment of the present invention.
Figure 6:
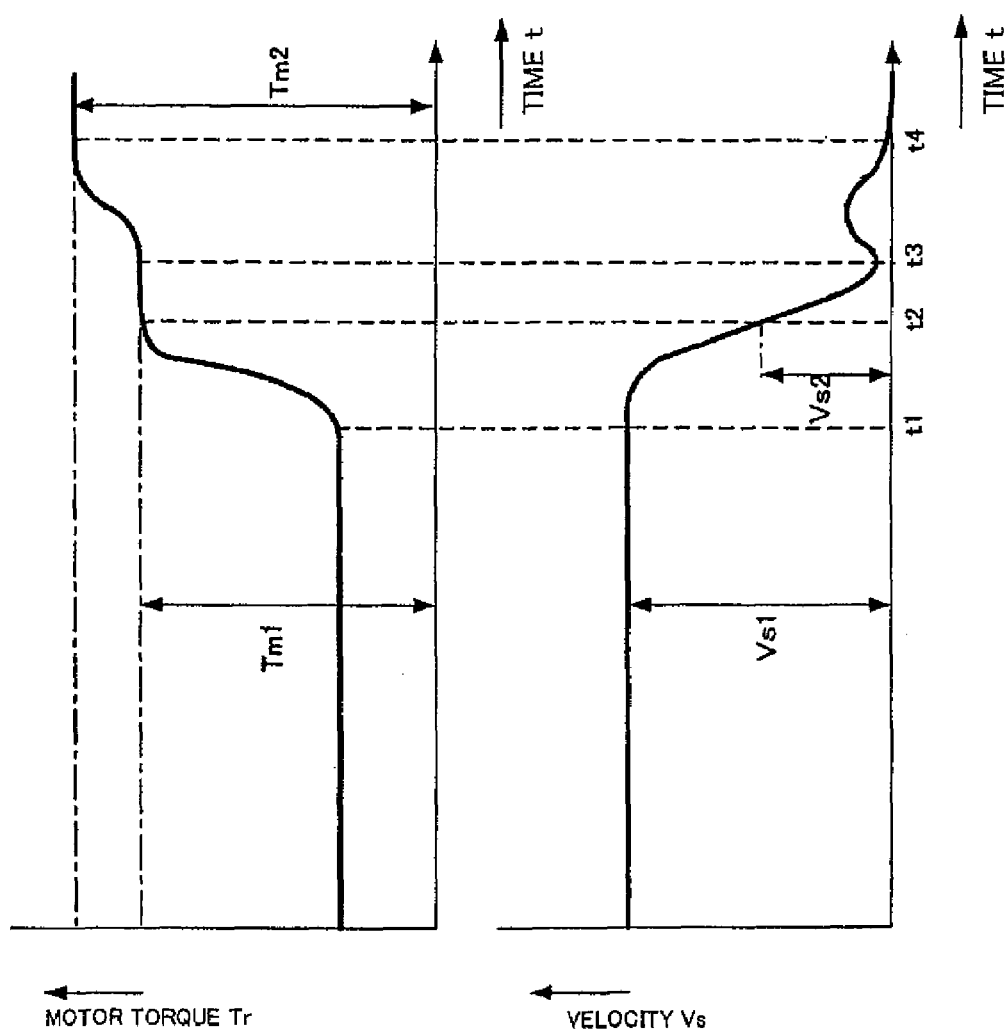
FIG. 6 is a graph showing changes of drive torque Tr and tailstock movement velocity Vs.
Figure 7:
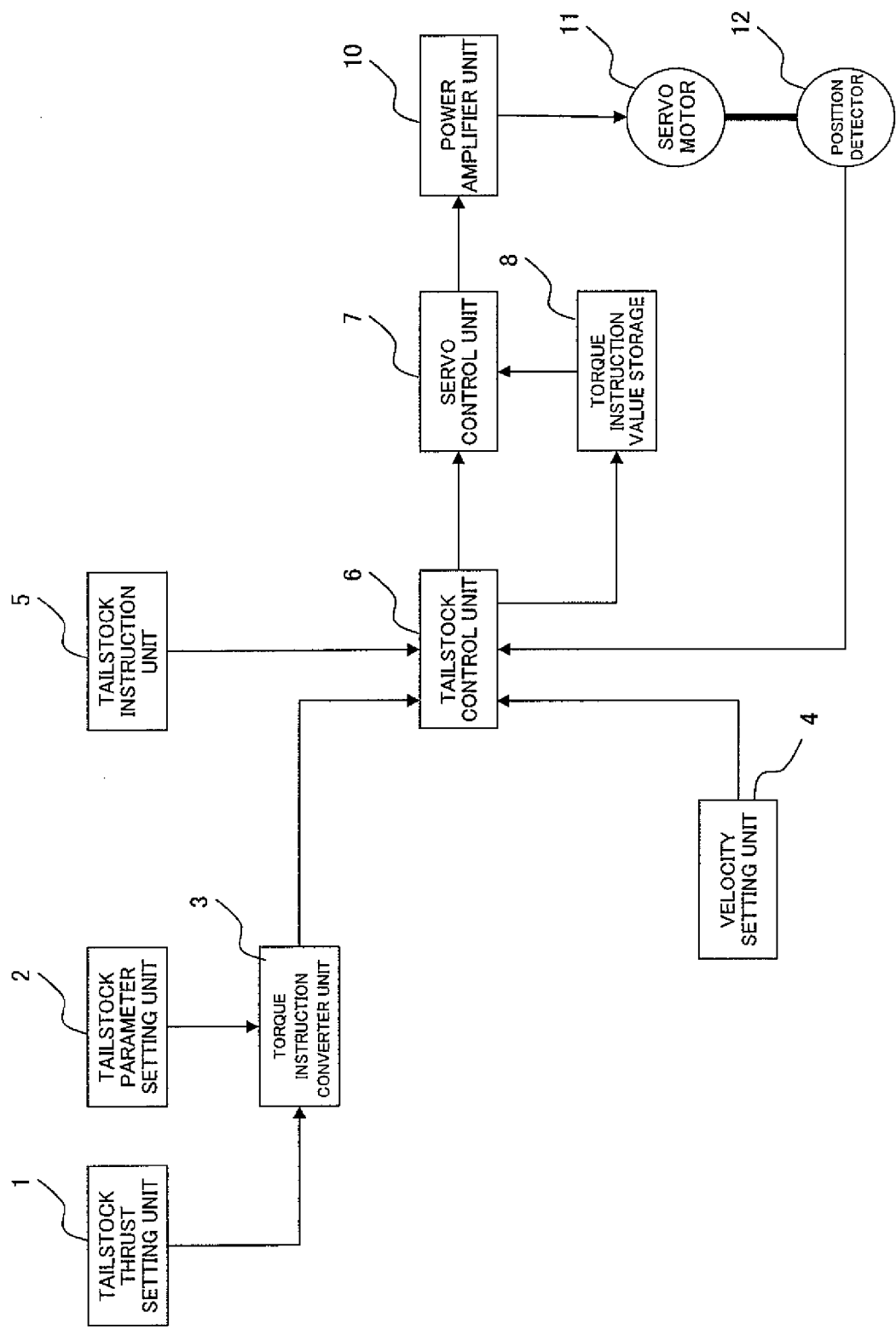
FIG. 7 is a block diagram of a tailstock control device of related art.

Next, a second preferred embodiment of the present invention will be described. FIG. 4 is a block diagram of a tailstock control device according to a second preferred embodiment. FIG. 5 is a flowchart showing a flow of control by the tailstock control device. FIG. 6 is a diagram showing changes of the drive torque Tr and the tailstock movement velocity Vs in the second preferred embodiment. Elements identical to those in the first preferred embodiment will not be described in detail.

The second preferred embodiment significantly differs from the first preferred embodiment in that a drive torque detection unit 19 which detects the torque instruction value Tr which is momentarily output, and outputs to the tailstock control unit 6, and a velocity detection unit 34 which detects the movement velocity Vs of the tailstock, are provided. In addition, the second preferred embodiment also differs from the first preferred embodiment in that the limit torque value Tm is re-calculated as necessary based on the detected drive torque Tr and the detected movement velocity Vs. The control by the tailstock control unit 6, in particular, the control related to the re-calculation of the limit torque value Tm, will now be described with reference to FIGS. 5 and 6.

In the second preferred embedment also, similar to the first preferred embodiment, first, a first excessive thrust Fs1 is calculated based on various parameters such as the tailstock movement velocity before contact with the object to be machined, that is, a first tailstock movement velocity Vs1 and the spring constant k (S20). Then, based on the first excessive thrust Fs1, tailstock parameters N, tailstock support thrust Fa, etc., a first limit torque value Tm1 is calculated (S30, S40).

Once the first limit torque value Tm1 is calculated, the servo control unit 7 drives and controls the servo motor 11 until the drive torque Tr reaches the limit torque value Tm1.

FIG. 6 shows a change in the drive torque Tr and the tailstock movement velocity Vs in this process. In FIG. 6, the time t1 represents the time when the tailstock center 101 contacts the object 100 to be machined. As is clear from FIG. 6, when the tailstock center 101 contacts the object 100 to be machined, the drive torque Tr is gradually increased and the tailstock movement velocity Vs is gradually reduced. In other words, after the time t1, the tailstock movement velocity Vs becomes less than or equal to the first tailstock movement velocity Vs1 which is used for calculation of the limit torque value Tm1. When the velocity Vs changes, the inertial force acting on the tailstock also changes. Moreover, when the force of inertia changes, the excessive thrust Fs caused by the inertial force or the like, and the limit torque value Tm necessary for supporting the object to be machined, also change.

In consideration of this, in the present embodiment, when the drive torque Tr reaches the first limit torque value Tm1 which is first calculated, the limit torque value Tm is again calculated based on the movement velocity at that point, that is, a second movement velocity Vs2 (Vs2<Vs1).

More specifically, the tailstock control unit 6 monitors, after the movement control of the tailstock is started (S50), whether or not the drive torque Tr has reached the first limit torque value Tm1 (S60). When the drive torque Tr reaches the first limit torque value Tm1, the tailstock control unit 6 instructs calculation of the second excessive thrust Fs2 based on the second tailstock movement velocity Vs2 which is detected by the velocity detection unit 34 at that point, that is, the time t2 in FIG. 6 (S70, S80). When the second excessive thrust Fs2 is calculated, a second limit torque value Tm2 is then calculated based on the second excessive thrust Fs2, tailstock parameters N, tailstock support thrust Fa, etc. (S100). When the second limit torque value Tm2 is calculated, the second limit torque value Tm2 is re-set in the limit value of the motor torque, and the movement operation of the tailstock is continued (S110). After this process, the tailstock control unit 6 monitors whether or not the drive torque Tr reaches the second limit torque value Tm2 (S120). When the drive torque Tr reaches the second limit torque value Tm2 (at time t4 in FIG. 6), it is possible to determine that a sufficient thrust for supporting the object to be machined is obtained. Therefore, in this case, the tailstock control unit 6 controls the servo control unit 7 or the like, to stop the movement operation of the tailstock. In this manner, the support operation of the object to be machined is completed.

As is clear from the above description, in the second preferred embodiment, the change of the movement velocity Vs due to contact of the tailstock center 101 and the object 100 to be machined is also considered, and the limit torque value Tm is suitably re-calculated. As a result, it is possible to obtain a more accurate limit torque value Tm, and to more reliably support the object to be machined. In the present embodiment, the limit torque value Tm is calculated only twice (that is, Tm1 and Tm2), but the present invention is not limited to such a configuration, and the limit torque value Tm may alternatively be calculated for a greater number of times. For example, in step S120, when the drive torque T reaches the second limit torque value Tm2, a third limit torque value Tm3 may be re-calculated based on a movement velocity Vs3 at that point.

What is claimed is:

1. A tailstock control device which supports an object to be machined by driving and controlling a servo motor which drives a driving system of a tailstock having a spring member in forward and backward directions, to cause a tailstock center connected to the tailstock to contact a center hole of the object to be machined, the tailstock control device comprising:
- a limit torque value calculating unit which calculates, as a limit torque value, a drive torque value of the servo motor necessary for supporting the object to be machined; and
- a servo control unit which drives and controls the servo motor to attempt to move the tailstock at a tailstock movement velocity which is set in advance, until an output torque value of the servo motor reaches the limit torque value, wherein the limit torque value calculating unit comprises:
- a unit which calculates, as a support thrust, a thrust of the tailstock necessary for supporting the object to be machined;
- an excessive thrust calculating unit which calculates, as an excessive thrust, an excessive thrust due to an elastic restoring force caused by compression of the spring member during a period between the contact of the tailstock center moving at the tailstock movement velocity with the object to be machined, and stopping of the tailstock center; and
- a unit which calculates the limit torque value by subtracting the excessive thrust from the support thrust.

2. The tailstock control device according to claim 1, further comprising:
- an actual velocity detection unit which detects, as an actual velocity, a velocity of the tailstock at the time when the output torque value of the servo motor reaches the limit torque value, wherein
- the limit torque value calculating unit re-calculates the limit torque value while replacing the set movement velocity with the actual velocity when the actual velocity is detected, and
- the servo control unit drives and controls the servo motor based on the re-calculated limit torque value when the limit torque value is re-calculated.

* * * * *